United States Patent
Schreiber et al.

(10) Patent No.: US 11,421,846 B2
(45) Date of Patent: Aug. 23, 2022

(54) HIGH BEAM HEADLIGHT

(71) Applicant: Fraunhofer-Gesellschaft zur Förderung der angewandten Forschung e.V., Munich (DE)

(72) Inventors: Peter Schreiber, Jena (DE); Chen Li, Jena (DE); Dirk Michaelis, Jena (DE); Christoph Wächter, Jena (DE); Stephanie Fischer, Jena (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/301,116

(22) Filed: Mar. 25, 2021

(65) Prior Publication Data
US 2021/0215314 A1    Jul. 15, 2021

Related U.S. Application Data

(63) Continuation of application No. PCT/EP2019/077216, filed on Oct. 8, 2019.

(30) Foreign Application Priority Data

Oct. 9, 2018 (DE) .......................... 102018217213.7

(51) Int. Cl.
*F21S 41/265*    (2018.01)
*F21S 41/663*    (2018.01)
(Continued)

(52) U.S. Cl.
CPC .......... *F21S 41/265* (2018.01); *F21S 41/143* (2018.01); *F21S 41/151* (2018.01); *F21S 41/663* (2018.01);
(Continued)

(58) Field of Classification Search
CPC .............. G02B 19/0066; G02B 3/0056; G02B 3/0043; F21S 41/151; F21S 41/143; F21S 41/663; F21S 41/265
See application file for complete search history.

(56) References Cited

U.S. PATENT DOCUMENTS 9,611,996 B2    4/2017 Brendle
9,951,919 B2    4/2018 Bauer et al.
(Continued)

FOREIGN PATENT DOCUMENTS

AT          514 967 A1    5/2015
DE    10 2008 039 092 A1    2/2010
(Continued)

OTHER PUBLICATIONS

International Search Report and Written Opinion dated Sep. 10, 2020, issued in application No. PCT/EP2019/077216.
(Continued)

*Primary Examiner* — Rajarshi Chakraborty
*Assistant Examiner* — Nathaniel J Lee
(74) *Attorney, Agent, or Firm* — McClure, Qualey & Rodack, LLP

(57) ABSTRACT

High beam headlight that can be produced with a small installation length with high efficiency and also provide effective low-cost manufacturability are described. For this purpose, a light source array having a plurality of light sources is combined with a honeycomb condenser. A collimator connected between the honeycomb condenser and the light source array illuminates the honeycomb condenser with collimated light of the plurality of light sources of the light source array. The arrangement of the components is such that the collimated light from a first light source leads to crosstalk-free irradiation of the honeycomb condenser and illumination of a first far-field segment. For each of the at least one second light source of the light source array, the collimated light of the respective second light source leads to irradiation of the honeycomb condenser with channel crosstalk and an illumination of a second far-field segment oriented obliquely with the first far-field segment.

16 Claims, 3 Drawing Sheets

(51) Int. Cl.
*F21S 41/143* (2018.01)
*F21S 41/151* (2018.01)
*G02B 3/00* (2006.01)
*G02B 19/00* (2006.01)
*F21Y 103/10* (2016.01)
*F21Y 115/10* (2016.01)

(52) U.S. Cl.
CPC ....... *F21Y 2103/10* (2016.08); *F21Y 2115/10* (2016.08); *G02B 3/0056* (2013.01); *G02B 19/0066* (2013.01)

(56) References Cited

U.S. PATENT DOCUMENTS

| | | | |
|---|---|---|---|
| 10,113,704 B2 | 10/2018 | Knittel et al. | |
| 10,591,126 B2 | 3/2020 | Mandl | |
| 2017/0241607 A1 | 8/2017 | Courcier | |
| 2017/0363266 A1 | 12/2017 | Feil et al. | |
| 2019/0072252 A1* | 3/2019 | Moser | F21S 41/68 |

FOREIGN PATENT DOCUMENTS

| | | | |
|---|---|---|---|
| DE | 10 2014 203 335 A1 | 8/2015 | |
| DE | 10 2014 223 933 A1 | 5/2016 | |
| DE | 10 2015 208 183 A1 | 11/2016 | |
| DE | 102015208183 A1 * | 11/2016 | ............... F21V 5/04 |
| DE | 10 2016 112 617 B3 | 10/2017 | |
| EP | 0 999 407 A2 | 5/2000 | |
| EP | 3 258 164 A1 | 12/2017 | |
| WO | 2017/066817 A1 | 4/2017 | |

OTHER PUBLICATIONS

Li, C., et al.; "Etendue conserving light shaping using microlens arrays with irregular lenslets," Proceedings of SPIE; SPIEDigitalLibrary.org/conference-proceedings-of-spie; Event: SPIE Optical Systems Design; Sep. 2018; pp. 1-9.

* cited by examiner

HIGH BEAM HEADLIGHT

CROSS-REFERENCE TO RELATED APPLICATIONS

This application is a continuation of copending International Application No. PCT/EP2019/077216, filed Oct. 8, 2019, which is incorporated herein by reference in its entirety, and additionally claims priority from German Application No. 102018217213.7, filed Oct. 9, 2018, which is also incorporated herein by reference in its entirety.

The present application relates to a high beam headlight, such as a high beam for installation in a vehicle.

BACKGROUND OF THE INVENTION

A high beam headlight for motor vehicles generates a highly focused far field with a half width of the angular distribution of the luminous intensity of approx. 5°. To prevent dazzling oncoming vehicles or vehicles driving in front, the high beam may have to be switched off and only the low beam may be used. By segmenting the high beam into individually switchable vertical strips having a horizontal width of less than 2°, dazzle-free operation is only possible by switching off the respective dazzling segments, thus improving illumination of the road.

An LED array mounted on a printed circuit board serves as the light source. The non-radiating areas between the individual LEDs are masked by special light guide or reflector fill optics. At the same time, this optics enables a slight divergence reduction of the radiation of the LED array. The output of the fill optics is mapped onto the road towards infinity by means of projection optics having long focal length with a comparatively large installation length. Due to the high temperature and optical power densities in close proximity to the LED array, the realization of the fill optics places high demands on materials and manufacturing processes. Furthermore, achromatically corrected projection optics are needed to suppress color fringing of the light segments. The total length of the optics results from the sum of the focal length of the projection optics and the length of the filling optics and results in large system dimensions.

Consequently, there is a need for a high beam or a high beam headlight providing high light efficiency with a short installation length and enables efficient manufacturability.

SUMMARY

According to an embodiment, a high beam headlight may have: a light source array with a plurality of light sources; a honeycomb condenser; a collimator connected between the honeycomb condenser and the light source array for illuminating the honeycomb condenser with respective collimated light of the plurality of light sources, wherein the light source array includes a first light source and at least one second light source, wherein each entry-side honeycomb lens of an entry-side honeycomb lens array of the honeycomb condenser includes an associated exit-side honeycomb lens of an exit-side honeycomb lens array of the honeycomb condenser into which the collimated light of the first light source is collimated by the respective entry-side honeycomb lens, to form together a channel of the honeycomb condenser, wherein for each of the at least one second light source, the collimated light of the respective second light source is collimated by the entry-side honeycomb lens array of the honeycomb condenser into the exit-side honeycomb lenses of the exit-side honeycomb lens array in a channel-crosstalk manner, such that the collimated light of the first light source of the light source array leads to crosstalk-free irradiation of the honeycomb condenser and illumination of a first far-field segment and for each of the at least one second light source, the collimated light of the respective second light source leads to irradiation of the honeycomb condenser with channel crosstalk and illumination of a second far-field segment oriented obliquely to the first far-field segment.

According to another embodiment, a motor vehicle may have an inventive high beam headlight.

A key idea of the present application is the finding that it is possible to provide a high beam or a high beam headlight that can be produced with a small installation length with high efficiency, and also enables effective low-cost manufacturability, by combining a light source array having a plurality of light sources with a honeycomb condenser. A collimator connected between the honeycomb condenser and the light source array illuminates the honeycomb condenser with collimated light of the plurality of light sources of the light source array. The arrangement of the components is such that the collimated light from a first light source leads to crosstalk-free irradiation of the honeycomb condenser and illumination of a first far-field segment. For each of the at least one second light source of the light source array, the collimated light of the respective second light source leads to irradiation of the honeycomb condenser with channel crosstalk and an illumination of a second far-field segment oriented obliquely with the first far-field segment. In other words, the one or several second light sources are arranged such that their collimated light when passing through the entry-side honeycomb lenses or lenslets of the honeycomb condenser are not collimated in the respective associated exit-side honeycomb lenses or lenslets of the honeycomb condenser, with which they form a respective channel, but into the exit-side honeycomb lenses or lenslets of another channel, such as the neighboring channel, which would correspond to a first crosstalk order, or to a channel after the next, which would correspond to a second crosstalk order etc. If the acceptance angles of the exit-side lenslets are maintained, the honeycomb condenser configuration automatically provides for seamless joining of the far-field segments associated with the light sources of the light source array, because they are illuminated by them. Thus, it is possible to obtain a segmented high beam when the light sources of the light source array can be controlled individually or in groups, or a high beam where desired segments are switched on or off, or are illuminated to a greater or lesser extent if the light sources can be controlled accordingly.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
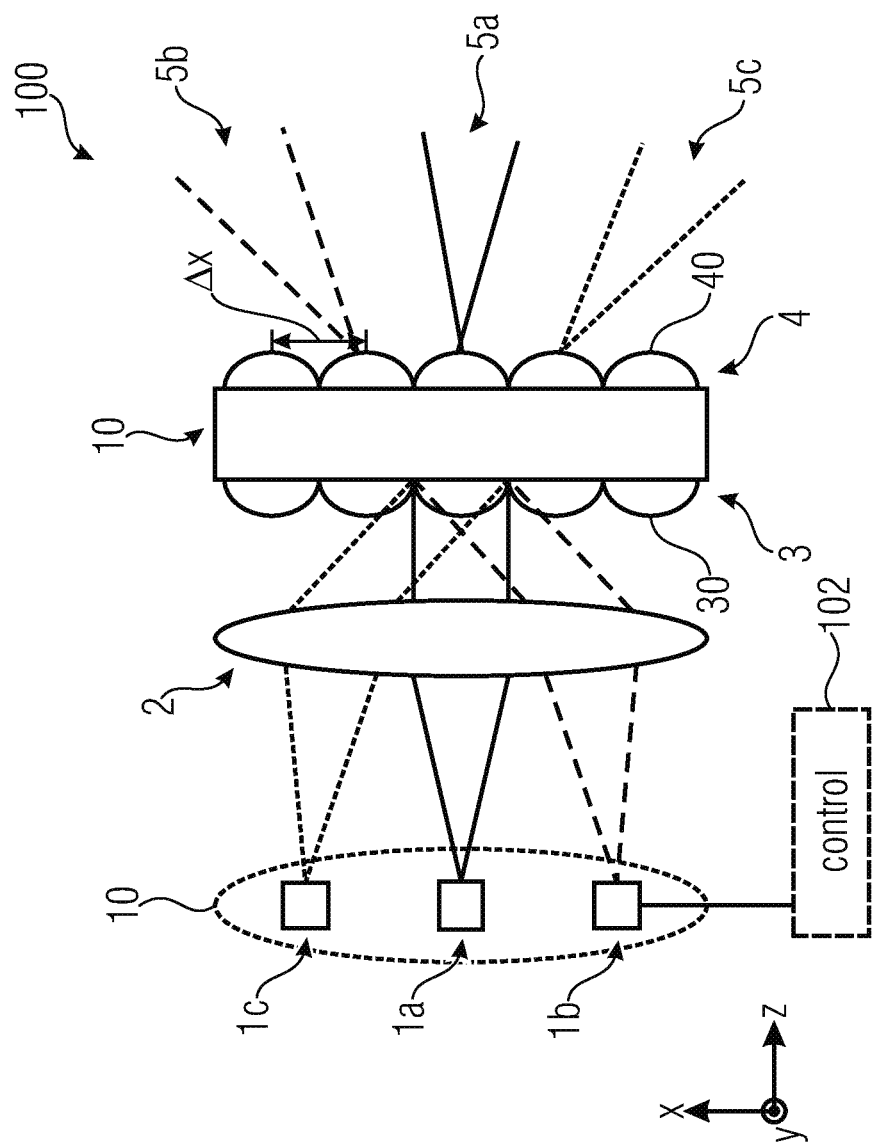
FIG. 1 is a schematic top view of a high beam or a high beam headlight according to an embodiment, namely viewed along the horizontal.
Figure 2:
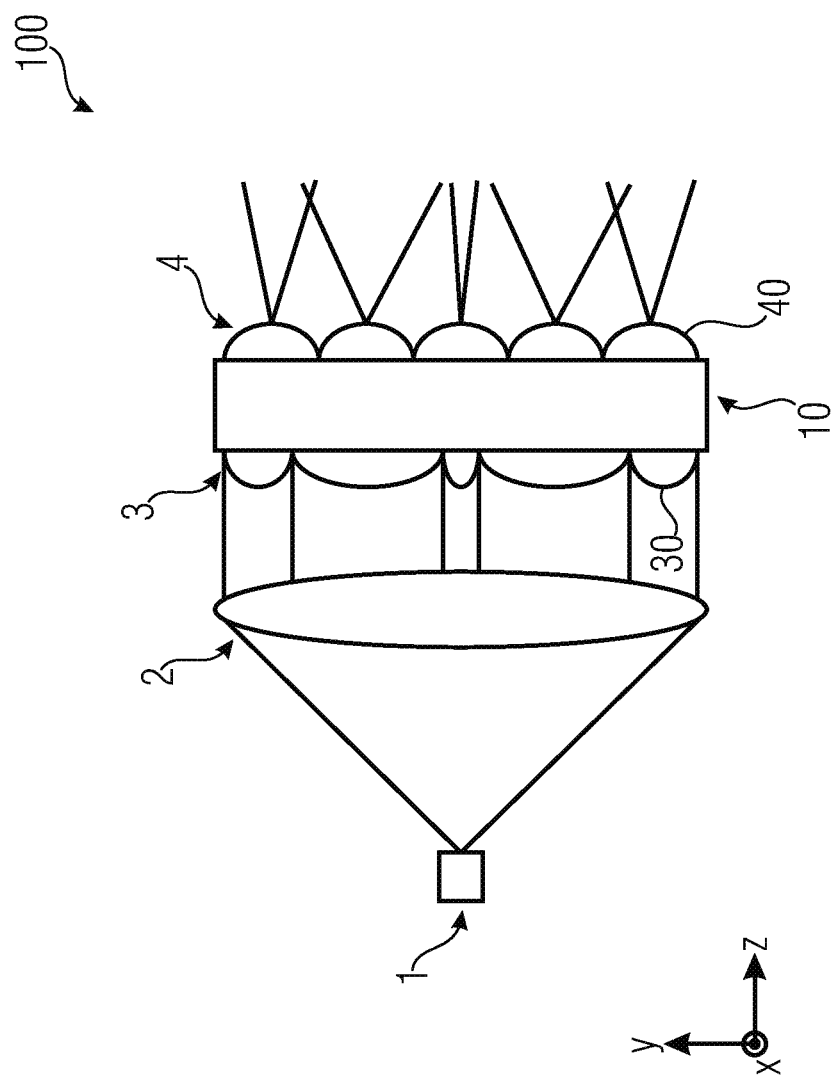
FIG. 2 is a schematic side view of the high beam or a high beam headlight of FIG. 1, viewed along the vertical.

The basic arrangement is shown as a top view in FIG. 1 and as a side view in FIG. 2. The light source is a linear LED cluster 1 with common collimating optics 2. The beam shaping optics consists of a vertically irregular, horizontally regular honeycomb condenser [1] with rectangular lenslets. The honeycomb condenser is structured as a tandem array consisting of an irregular input array 3 and a regular output array 4. The irregularity of the input array exists only in the vertical.

If only the central LED 1a is switched on, all input lenslets map this LED only onto the respective associated output lenslet and thus realize an illumination optical path with Kohler illumination in each array channel. In FIG. 1, only the optical path in the central input lenslet is shown for clarity. The output lenslets in turn map the apertures of the associated input lenslets to infinity, creating the central far-field segment 5a of the high beam. Due to the vertical irregularity of the input array, an approximately symmetrical bell-shaped angular distribution of the segment's luminous intensity is obtained vertically, but a rectangular tophat angular distribution is obtained horizontally.

If the LEDs adjacent to the central LED on the right 1b or left 1c in the direction of light propagation are activated, the input lenslets map them onto the output lenslet in the respective adjacent channel on the left or right. In FIG. 1, again for clarity, only the optical path for beams incident into the central input lenslet is illustrated. This channel crosstalk leads to the formation of the segments adjacent to the central far-field segment on the left 5b and right 5c in the direction of travel. LEDs further away from the central LED, which are not illustrated for clarity, cause channel crosstalk to the next but one channel or to a channel even further away, thus allowing the illumination of far-field segments even further away from the optical axis of the system.

The configuration of the input lens array as an irregular array with high fill factor guarantees the continuous connection of the segments and makes the use of special fill optics superfluous. The LEDs of the array are arranged in such a way that, taking into account the distortion of the collimator, only the desired channel crosstalk is generated in each case but no light components in other channels. Since the f-numbers of the lenslets are comparatively large, typically f/#>10, only minimal aberrations occur and achromatization of the projection is not needed. By individually controlling the LEDs, in addition to dazzle-free illumination, a horizontal luminous intensity profile of the high beam can also be set, which enables, e.g. power-saving operation.

In other words, the above figures show a high beam or a high beam headlight 100 comprising a light source array 1 with a plurality of light sources 1a-1c, although as mentioned above, the number is not limited to three, but may be two or more. Further, the high beam 100 comprises a honeycomb condenser 10 and a collimator 2 connected between the honeycomb condenser 10 and the light source array 1 for illuminating the honeycomb condenser 10 with collimated light of the plurality of light sources 1a-1c. The latter, as noted above, may be controlled individually or in groups to provide a segmented high beam as described above. The controllability is realized by a control circuit 102 optionally associated with the headlight 100 and may be limited to on/off control, but could also include luminous intensity control. The light sources 1a-1c are located in the focal plane of the collimator 2.

Figure 3:
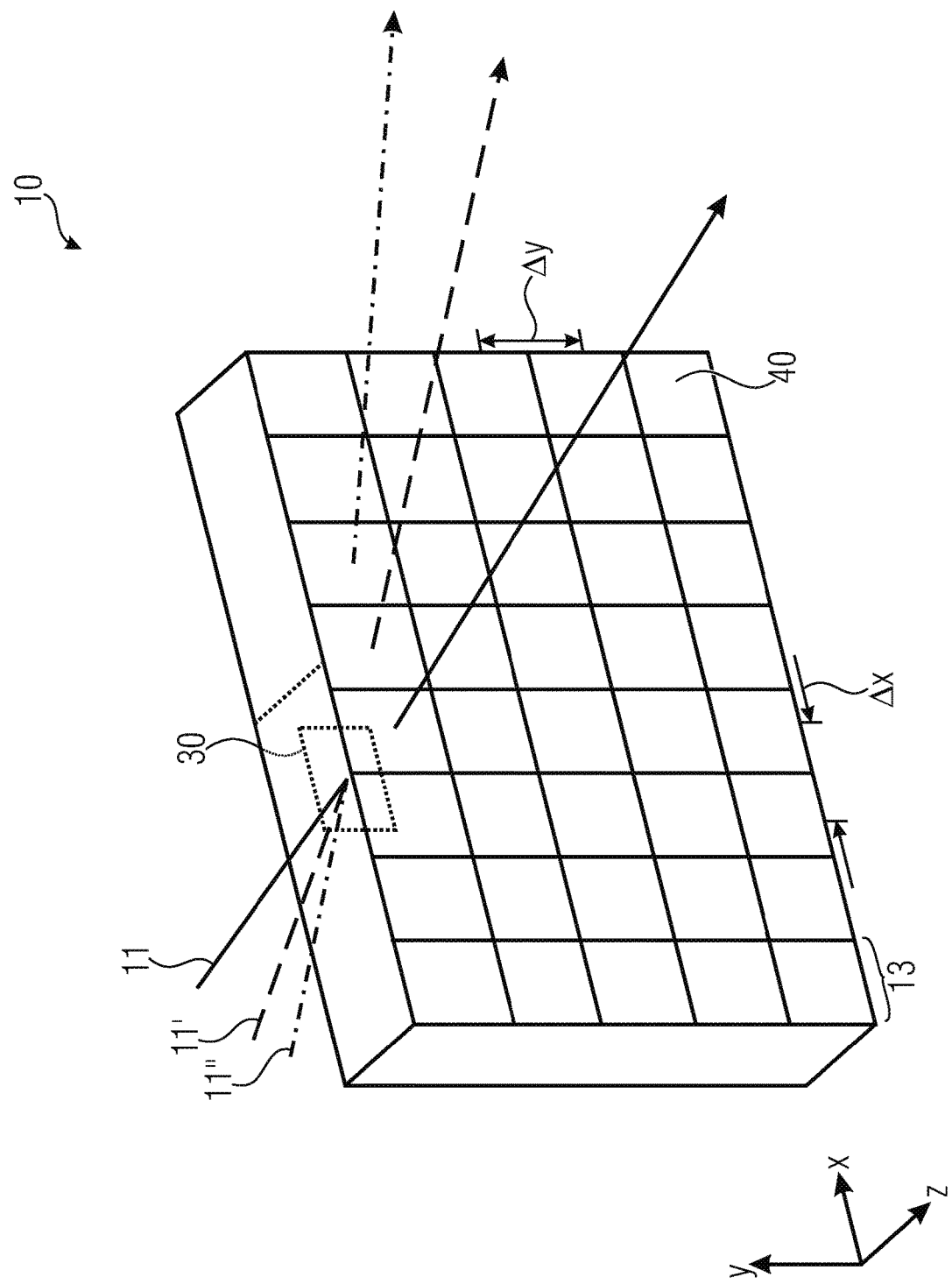
FIG. 3 is a schematic spatial representation of the honeycomb condenser of FIGS. 1 and 2.

In particular, among the light sources, there exists a light source 1a which is not necessarily the center one in the focal plane of the collimator 2 among the light sources of the light source array 1. This light source 1a results in collimated light via the collimator 2, which leads to crosstalk-free irradiation of the honeycomb condenser 10. For any other light source, here 1b and 1c, the respective collimated light leads to irradiation of the honeycomb condenser 10 with channel crosstalk. In other words, the honeycomb condenser 10 is equipped with a honeycomb lens array 3 on the entry side and a honeycomb lens array 4 on the exit side. Each entry-side honeycomb lens or entry-side lenslet 30 of the input array 3 is associated with a respective exit-side lenslet or exit-side honeycomb lens 40 of the output array 4 to form a channel together, in that the former collimates the collimated light from the light source 1a into that associated exit-side honeycomb lens 40. For this purpose, the output lenslets 40 are arranged at a distance from the latter within the focal length of the input lenslets 30 and, vice versa, the input lenslets 30 are arranged at a distance from the latter within the focal length of the output lenslets 40 and, additionally, the input lenslets and output lenslets are regularly arranged with a constant repetition distance $\Delta x$ from each other. In FIGS. 1-3, the exemplary case was illustrated that the collimated light from the light source 1a is incident perpendicularly on the honeycomb condenser 10, in which case lens apertures and lens vertices of an associated pair of input lenslet 30 and output lenslet 40 are aligned exactly with each other along the horizontal direction x, but an alternative embodiment would also be possible. In FIG. 3, which only exemplarily shows that the honeycomb condenser 10 possibly comprises 40 channels, a light beam 11 of the collimated light of the light source 1a is exemplarily shown, which impinges on a certain input lenslet 30 in order to exit again from the associated output lenslet 40. The beam 11 passes virtually in a channel of the honeycomb condenser 10. With dashed lines 11', FIG. 3 shows the collimated light of one of the other light sources as it impinges on the same input lenslet 30 but then exits through a different output lenslet 40. The output lenslet through which the light beam exits is an output lenslet adjacent to the output lenslet through which the light beam 11 from light source 1a passed. This was referred to as the first crosstalk order above. At 11", FIG. 3 shows with a dash-dotted line a light beam originating from again another light source, which passes through the same input lenslet 30 as the other beams 11 and 11', but exits through again another output lenslet 40, which in this case is spaced from the output lenslet through which the light beam 11 passes, i.e. that of light source 1a, by one output lenslet, i.e. represents a neighbor next but one in the output array 4. This is then referred to as the second crosstalk order. Further, different and higher crosstalk orders could be possible.

In the above described embodiments, the light sources 1a-1c were arranged along a one-dimensional line, in this case along the horizontal x. However, deviating embodiments, in which the light sources are arranged differently, such as e.g. also two-dimensionally, would also be possible. As a result of the one-dimensional arrangement of the light sources 1, the collimated light from the "other" light sources 1b and 1c, i.e., those light sources which lead to channel crosstalk, lead to column-wise channel crosstalk. Thus, the honeycomb condenser 10 and its input and output arrays 3 and 4 comprise columns 13 of lenslets 30 and 40, respectively, each of which are formed identically and are adjacent at a certain repetition distance along the direction x or conformably merges into each other by translation in multiples of the repetition distance. Thus, each pair of input and output lenslets 30 and 40 forming a channel in one column corresponds to a pair in any other column, namely the one in the same row of the array 3 and 4, respectively, and channel crosstalk means that the light of one input lenslet 30 is not collimated into its associated output lenslet 40 in the same column 13, but into an output lenslet 40 of the corresponding pair of input and output lenslets 30 and 40 in another column 13, such as the neighboring column in the case of the first crosstalk order, and so on.

The output lenslets 40 also form a regular array in the y direction within each column 13. In other words, in the foregoing embodiments, the array of output lenslets 40 formed a regular array with constant repetition distance Δx in x and constant repetition distance Δy in y. The lens apertures of the output lenslets 40 are rectangular and joined continuously. However, in each column 13, the input lenslets 30 have lens apertures of different sizes. The lens aperture variation relates to the extension of the lens apertures in the y direction, as shown in FIG. 2. Nevertheless, each input lenslet 30 collimates the collimated light from the light source 1a incident into the same into the center of its associated output lenslet 40. In each column 13, one or several of the input and/or output lenslets 30 and 40 may have a lens vertex decentered with respect to their lens aperture along the y direction. Decentering and lens aperture variation serve to achieve a desired luminous intensity angle distribution in the y direction with which the segments 5a-5c are illuminated. Here, the angular distribution has become wider with a peak at a predetermined angle or perpendicularly forward in that some input lenslets 30 have a greater lens aperture extent in y relative to their associated output lenslet 40, with the lens vertex mutually oriented in y and each centered relative to its lens aperture. Other implementations would also be possible.

Thus, the high beam headlight 100 enables individual illumination of high beam segments 5a, 5b and 5c. According to the one-dimensional side-by-side arrangement of the light sources 1a-1c, the far-field segments fan out along the spatial direction x. However, they are seamlessly adjacent to each other. As mentioned above, the entry-side lenslets 30 may be slightly pre-defocused to provide better focusing on average across all occurring crosstalk orders (where no channel crosstalk would correspond to zero order). Thus, the entry-side honeycomb lenses of the entry-side honeycomb lens array 3 of the honeycomb condenser 10 can be positioned, with respect to a plane in which the exit-side honeycomb lenses 40 of the exit-side honeycomb lens array 4 of the honeycomb condenser 10 are arranged for the collimated light of the first light source 1a in a more defocused manner than for collimated light having a collimation direction between that of the collimated light of this light source 1a and that of the collimated light of such other light source having maximum crosstalk order among the light sources, i.e., light source 1b or 1b.i.e. light source 1b or 1c in the case of FIG. 1. Effectively, therefore, in FIG. 1, for example, the output lenslets 40 would be a little closer to the input lenslets than they would optimally be for crosstalk-free irradiation, but also further away than they would optimally be for channel-crosstalk irradiation by one of the light sources 1b and 1a.

The micro-optical realization as a multi-aperture system for beam shaping makes it possible to reduce the installation length compared to conventional systems. The micro optical beam shaping eliminates the need for separate fill optics and achromatic correction of the projection optics. Compared to projecting systems with transparency arrays or apertures, increased system transmission is achieved.

The above embodiments can be used as high beam for motor vehicles, but also generally as switchable spotlights. Two-dimensional, variable illumination of larger areas with rectangular pixels could be realized.

Accordingly, in other words, the above embodiments describe, among other things, a segmented high beam with multi-aperture optics. In this context, it was described that the segmented high beam comprises a collimated light source array and a subsequent honeycomb condenser for beam shaping, wherein a central element of the light source array, for example, or a central light source, produces a perpendicular irradiation of the honeycomb condenser, but all other elements produce an oblique irradiation and thus a defined channel crosstalk. A configuration of the light source array as a one-dimensional linear array of multiple emitters was shown as an example. Collimation of the light source array can be accomplished by an aspherical lens as shown. Alternatively, collimation of the light source array by a two-lens arrangement consisting of a field lens and a collimating asphere is also possible. As shown, the honeycomb condenser can be formed as an irregular honeycomb condenser in the vertical direction y and a regular honeycomb condenser in the horizontal direction with rectangular lenslets. In FIG. 2, the honeycomb condenser was formed by an input lens array of rectangular lenslets irregular in the vertical direction and a regular output array of rectangular lenslets. It is also possible for the honeycomb condenser to comprise an output lens array that also includes lenslets that are off-center in the vertical direction but with constant vertical extension of the lens apertures. The honeycomb condenser can be configured as a monolithic tandem array. By individually controlling the LEDs, dazzle-free luminous intensity distribution can be achieved.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] C. Li, P. Schreiber, D. Michaelis, Ch. Wächter, St. Fischer, U. D. Zeitner: "Etendue conserving light shaping using microlens arrays with irregular lenslets", SPIE 10693 (2018) 1069304.

The invention claimed is:
1. High beam headlight comprising
a light source array with a plurality of light sources;
a honeycomb condenser;
a collimator connected between the honeycomb condenser and the light source array for illuminating the honeycomb condenser with respective collimated light of the plurality of light sources,
wherein the light source array comprises a first light source and at least one second light source,
wherein each entry-side honeycomb lens of an entry-side honeycomb lens array of the honeycomb condenser comprises an associated exit-side honeycomb lens of an exit-side honeycomb lens array of the honeycomb condenser into which the collimated light of the first light source is collimated by the respective entry-side honeycomb lens, to form together a channel of the honeycomb condenser, wherein for each of the at least one second light source, the collimated light of the respective second light source is collimated by the entry-side honeycomb lens array of the honeycomb condenser into the exit-side honeycomb lenses of the exit-side honeycomb lens array in a channel-crosstalk manner, such that the collimated light of the first light source of the light source array leads to crosstalk-free irradiation of the honeycomb condenser and illumination of a first far-field segment and for each of the at least one second light source, the collimated light of the respective second light source leads to irradiation of the honeycomb condenser with channel crosstalk and illumination of a second far-field segment oriented obliquely to the first far-field segment.

2. High beam headlight according to claim 1, wherein the light sources of the light source array are controllable individually or in subgroups.

3. High beam headlight according to claim 1, wherein the light source array is configured as one-dimensional light source array along a first spatial direction and the first and second far-field segments fan out along the first spatial direction.

4. High beam headlight according to claim 3, wherein the entry-side honeycomb lens array of the honeycomb condenser comprises entry-side honeycomb lens columns extending in a second direction perpendicular to the first spatial direction, which are arranged equidistantly to each other in the first spatial direction at a repetition distance, and the exit-side honeycomb lens array of the honeycomb condenser comprises exit-side honeycomb lens columns extending in a second direction perpendicular to the first spatial direction, the exit-side honeycomb lens columns, which are arranged equidistantly to each other in the first spatial direction at the repetition distance and to the exit-side honeycomb lens columns such that the collimated light of the first light source is collimated into an associated one of the exit-side honeycomb lens columns through each of the entry-side honeycomb lens columns.

5. High beam headlight according to claim 4, wherein entry-side honeycomb lenses of a predetermined entry-side honeycomb lens column differ from exit-side honeycomb lenses of the exit-side honeycomb lens column associated with the predetermined entry-side honeycomb lens column with respect to arrangement of lens apertures and/or lens vertices along the second spatial direction.

6. High beam headlight according to claim 5, wherein the exit-side honeycomb lenses of the exit-side honeycomb lens column associated with the predetermined entry-side honeycomb lens column comprise mutually congruent lens apertures which are arranged equidistantly to each other.

7. High beam headlight according to claim 5, wherein the exit-side honeycomb lenses of the predetermined exit-side honeycomb lens column comprise mutually congruent lens apertures which are arranged equidistantly to each other, and each comprise centered lens vertices.

8. High beam headlight according to claim 5, wherein at least one of the entry-side honeycomb lenses of the predetermined entry-side honeycomb lens column and/or exit-side honeycomb lenses of the exit-side honeycomb lens column associated with the predetermined entry-side honeycomb lens column comprises a lens vertex decentered with respect to its lens aperture along the second direction.

9. High beam headlight according to claim 4, wherein entry-side honeycomb lenses of a predetermined entry-side honeycomb lens column differ from exit-side honeycomb lenses of the exit-side honeycomb lens column associated with the predetermined entry-side honeycomb lens column with respect to arrangement of lens apertures and/or lens vertices along the second spatial direction such that a luminous intensity distribution, with which the first high beam segment is illuminated via the entry-side honeycomb lenses of the predetermined entry-side honeycomb lens column and the exit-side honeycomb lenses of the exit-side honeycomb lens column associated with the predetermined entry-side honeycomb lens column by the collimated light of the first light source, comprises a wider angular distribution in the second spatial direction than in a case of matching the entry-side honeycomb lenses of the predetermined entry-side honeycomb lens column to the exit-side honeycomb lenses of the exit-side honeycomb lens column associated with the predetermined entry-side honeycomb lens column with respect to the arrangement of lens apertures and lens vertices.

10. High beam headlight according to claim 1, wherein
the collimated light of a predetermined second light source passes through the honeycomb condenser with a crosstalk order that is at a maximum under the at least one second light source, and
the entry-side honeycomb lenses of the entry-side honeycomb lens array of the honeycomb condenser are arranged, with respect to a plane in which the exit-side honeycomb lenses of the exit-side honeycomb lens array of the honeycomb condenser are arranged, in a more defocused manner for the collimated light of the first light source than for collimated light with a collimation direction between that of the collimated light of the first light source and that of the collimated light of the predetermined second light source.

11. High beam headlight according to claim 1, wherein the collimator is configured in an aspherical manner to improve the collimation of the collimated light of the at least one second light source compared to a spherical configuration.

12. High beam headlight according to claim 1, comprising a field lens cooperating with the collimator to illuminate the honeycomb condenser with the collimated light of the plurality of light sources.

13. High beam headlight according to claim 1, wherein the honeycomb condenser is formed as a monolithic tandem array.

14. High beam headlight according to claim 1, which is configured to be dazzle-free.

15. High beam headlight according to claim 1, which is intended for use in a motor vehicle.

16. Motor vehicle comprising a high beam headlight according to claim 1.

* * * * *